Figure 1:
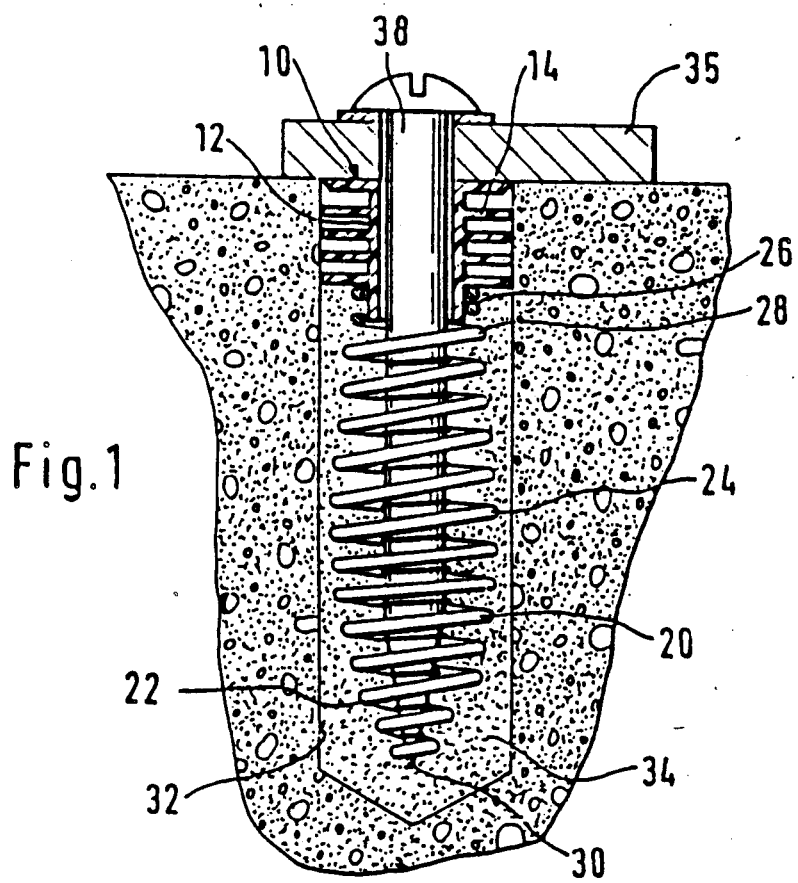

United States Patent [19]

Maechtle et al.

[11] Patent Number: 4,989,389
[45] Date of Patent: Feb. 5, 1991

[54] MORTAR-ANCHORED SYSTEM

[75] Inventors: Irmgard Maechtle; Guenther Woehler, both of Korntal-Muenchingen; Joachim Mayer, Stuttgart, all of Fed. Rep. of Germany

[73] Assignee: 501 Maechtle GmbH, Korntal-Muenchingen, Fed. Rep. of Germany

[21] Appl. No.: 311,821

[22] Filed: Feb. 17, 1989

[30] Foreign Application Priority Data

Oct. 26, 1988 [DE] Fed. Rep. of Germany ....... 3836464

[51] Int. Cl.⁵ .................................................. E04B 1/38
[52] U.S. Cl. ......................................... 52/705; 52/707
[58] Field of Search ................. 52/704, 705, 707, 710; 411/16, 17, 18, 69, 82, 182

[56] References Cited

U.S. PATENT DOCUMENTS 3,005,292 10/1961 Reiland .................................. 52/704
3,922,831 12/1975 Fischer .................................. 52/704

Primary Examiner—Michael Safavi
Attorney, Agent, or Firm—Shlesinger & Myers

[57] ABSTRACT

A mortar-anchored system for fastening to supports and lightweight building blocks, perforated bricks or masonry made of aerated concrete. The mortar-anchored system includes a bush segment for engaging the side walls of a wall bore hole in the building material and having a hollow center for insertion of mortar. A fastening screw is then inserted through the opening in the bush segment into the wall bore hole and is then anchored when the mortar dries.

9 Claims, 2 Drawing Sheets

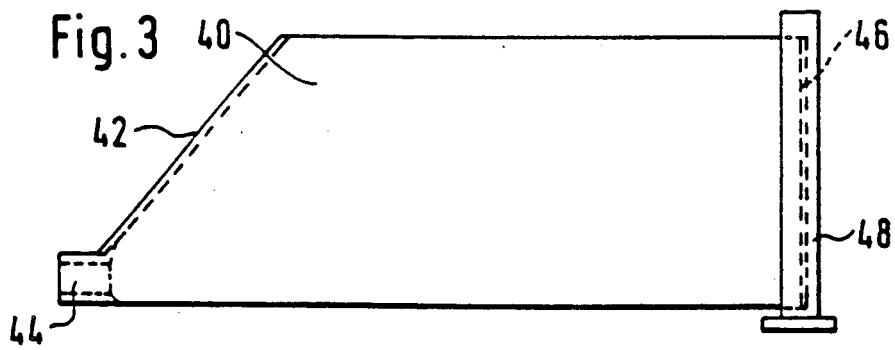
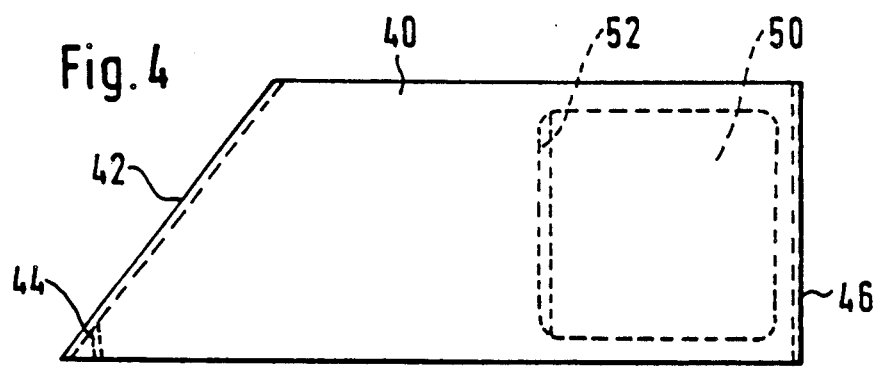
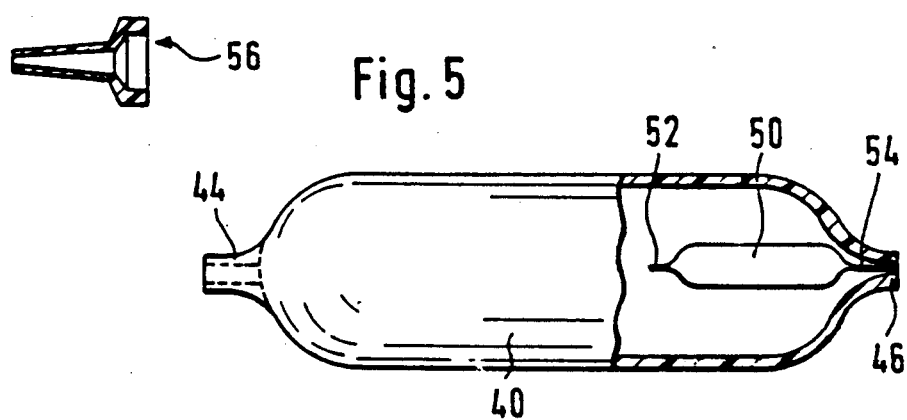
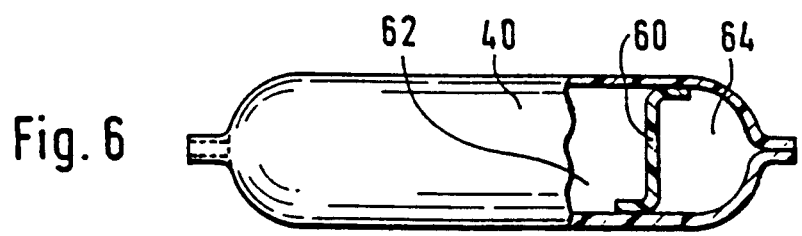

MORTAR-ANCHORED SYSTEM

The invention concerns a mortar-anchored system to fasten supports in lightweight building blocks, perforated bricks or masonry made of aerated concrete, wherein a wall borehole comprising an anchoring means is filled through a lid means with injected mortar and where a fastening screw threaded through the lid means into the anchor.

"Injection anchors" are known to fix in place a dowel (anchor) of low strength such as pumice or sand-lime mortar without applying expansion pressure, for which anchors mortar in the form of a poured filler material is introduced by an injection means into the readied borehole, the wall borehole being covered at the front by a stopper. Frequently the poured material is a binary plastic which shall only cure when both components are introduced into the wall borehole. The introduction and simultaneous mixing of the two components is inconvenient and perforce entails delicate handling impossible under the rough operating conditions of a construction site, whereby walls are soiled and anchoring defects take place. Frequently the curing times of such filler materials are long.

In one known system the anchoring introduced into the mortar consists of a metal or plastic sleeve maintained in the wall borehole filled with the poured material. Such sleeves are equipped at their periphery with apertures and at their backs with threads for the injected fastening screw. The injected filler is expected to pour forward through the apertures and to fill the space between the sleeve and the wall borehole, to cure and then to anchor the sleeve. This system is unsuited for small wall bores because its apertures would be too small, so that the filler will easily reach the outside, and on the other hand because the sleeve would become too weak.

The object of the invention is a mortar-anchored system especially for anchoring means of small diameters and in lightweight construction materials, which is characterized by simplicity of application and by being independent of how it is inserted and of the nature of the mortar, and which further evinces high resistance to extraction.

This problem is solved by the invention in that the lid means includes a bush segment entering the wall borehole and of which the entry issuing into the lid is designed as a link for the nozzle body of a mortar-expelling, i.e. injecting device, and of which the outer periphery acts as a retention means for the rear end of a wound wire spring part of the anchoring means, and in that the wire spring diameter tapers from a zone extending over a substantial length of the wall borehole and allowing unhampered spreading of the mortar, toward its front end, acting as a guide for the thread of the fastening plate.

The mortar-anchored system is characterized by simple, or commercially available individual parts, further by a mortar material easily injected from the injection device on the construction site, and a commercial wood screw, the lid means with bush being integrally injection-molded and merely a winding spindle being required to manufacture the wound wire spring. This wire spring is an important feature of the anchoring system of the invention; it tapers at the advancing end where it acts as a guide for the fastening bolt or screw. It also fills a second function in that—extending through all diameter zones of the wall borehole—it acts as reinforcement for the mortar which thereby assumes increased bearing strength, and most of all, it does not hamper the mortar from entering and spreading through the wall borehole.

The plug-in or screw connection of the wire spring to the outside periphery of the bush segment is advantageous for easy assembly because the reinforcement is introduced simultaneously with the lid means. Annular fins on the bush outside improve the introduction procedure, dragging against the borehole walls and thereby deforming and being fixed in place under stress and preventing the lid means from falling out of the borehole. By means of the bush segment, the fastening screw is inserted from the front toward the tapered spring end and the forces acting on the anchor are transmitted through the screw toward the spring end into the depth of the borehole and from there into the wall. The plastic lid means therefore couples the mortar injection device on one hand and on the other seals the wall borehole, centers the screw and keeps the spring in place.

The mortar injecting device shall be a container for dosing, mixing and filling compound substances, where this container furthermore shall be easy to carry and easy to handle from a scaffold on the construction site. Moreover, where small amounts are involved, both filler components shall be optimally mixed.

In the invention, the container essentially consists of a soft plastic hose ordinarily closed at both ends and filled with one component of a compound material, means being provided to combine an amount of the second component adequate for reaction with the contents of the hose-container and to mix it with said contents, and moreover an injection aperture shall be provided at one end of the hose.

Employing such packaged doses, a saving in injection material is achieved, where such material otherwise would be eft at the construction site or would dry upon opening in large containers and thus be lost. An important part of the invention is the direct use of the flexible plastic dosage package as the injection tool.

In one embodiment mode, the above advantages can be achieved by using a flexible plastic filling tube conventional for foodstuffs, tubes of various sizes being applicable depending on the size of the dowel or the borehole diameter and length. In the process, a suitable, dry mortar material from the manufacturer or from the site is filled-in and then, as called for, is mixed on the construction site with the second component, for instance water, which is filled-in either after a tube-sealing clamp has been released or by removing it from a second container with a rated rupture-seam present within the tube. In order to introduce the mortar following its mixing and preparation either through a tear-open or cut-open aperture at the edge of the hose foil, or—if present—through an opened threaded seal, into the borehole, an injection nozzle of suitable shape may be mounted directly on the hose container or after the sealing lid has been screwed off.

Even though in one application the filled-in mortar material is mixed with the second component only at the site of use, the liquid being carried along in a separate container, a variation of the invention provides that a container holding the second component already is housed initially in the hose container for the first component. Container for the second component may be a small, welded-in pouch to be destroyed, i.e. opened by external, manual action, without thereby damaging the outer supply container.

It is important in this respect that no dead zones arise in the tube or in the hose container, whereby mixing would be degraded. Accordingly a conventional kind of tube, for which the threaded seal is joined to a comparatively stiff funnel-shaped plate, is unsuitable.

A preferred embodiment for a dosage container is a tubular foil which can be welded shut at both ends. Such a rigorously welded tube may comprise at one side a welded-in aperture-stub or a threaded sleeve that can be clamped around the foil aperture.

An amount of water, possibly containing an admixture of additive(s) to prevent freezing, may be present in a smaller and welded-in pouch which illustratively may also be made of hose foil. In use, pressure is applied to a specific spot or a seam of the hose packing, whereby the inside, water-holding pouch will rupture, the water then being mixed with the cement mortar or the like by flexing and pressing the tube. Further advantages and features of the invention shall be elucidated below in the description of illustrative embodiments and the drawing and in the claims. The features of the claims may form individual embodiment modes or may be combined into such modes of the invention.

Figure 2:
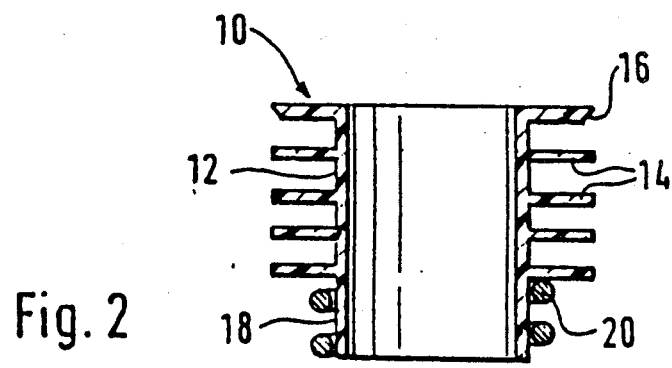

FIG. 1 is a partly schematic cross-section of a wall borehole with the mortar-anchored system of the invention, FIG. 2 is a Cross-section of the lid-means, FIG. 3 is an elevation of a flexible-plastic tube with a sealing clamp at its end, FIG. 4 is a hose-container welded at both its ends and with an inside second container in the form of a pouch, FIG. 5 is a lengthwise section of a dosage-container similar to FIG. 4, and FIG. 6 is a lengthwise section of a dosage-container of another embodiment mode.

A wall borehole 32 shown cross-sectionally in FIG. 1 and located in lightweight concrete masonry is filled with mortar material 34. The front end of the borehole is sealed by the lid-means 10 which is fixed in place in the walls of the borehole by the friction of fins 14. The mortar material is introduced using an injecting nozzle through the aperture-adapting bush segment 12. The opening or entry of the bush segment 12 acts as a coupling for the injecting nozzle.

The lid or sealing means 10 comprises at the front end of the bush 12 a segment 18 seating, in slipped-on or screwed-on manner, a wound wire spring 20. The periphery of the front segment 18 of the guide bush 12 may include beads or projections to retain the hook-up part 26 of the wire spring. Illustratively the projections may be in the shape of an outer thread having approximately the same pitch as the windings of the wire spring 20.

Seen in profile, the wire spring 20 comprises a front tapered portion 22 merging into a portion 24 having the widest diameter approximating that of the wall borehole 32, and a rear portion 28 with the hook-up end 26 to slip or thread this spring onto the free end of the bush 12. The thread segments of the wire spring 20 extend through all diameter ranges of the borehole when filled with mortar 34. The wire spring acts as reinforcement within the curing mortar material and simultaneously the coils of the wire spring extending through all layers of the mortar filling effectively rest in this mortar, whereby the wire spring 20 acting as an anchoring element can withstand high forces of extraction acting on it from the tapered front end 30 of the wood screw 38.

At any rate the front tapered end 22 of the wire spring will form a take-up and anchoring portion for the fastening screw 38, which also is supported and centered near the borehole entrance by and in the guide sleeve 12 in order to anchor a construction component 35.

FIGS. 1 and 2 show a plastic lid member 10 to seal the mortar-filled wall borehole 32. The actual lid 10 consists of a shell or cylindrical flange integrated into the rear end of the guide bush 12 receiving the fastening screw. The outside periphery of the lid 10 may be beveled or tapered at the location 16 whereby this edge will be somewhat elastic to adapt itself with its excess size to irregularities in the wall borehole 32. Several positioning or sealing fins 14 are integral with the periphery of the guide bush 12 and extend radially outward as far as the nominal diameter of the wall borehole. The fins 14 center the lid means 12 and may comprise a suitably irregular surface on their outsides to achieve frictional positioning. They are not restricted to the number and size shown in the bush segment of the illustrative embodiment.

FIG. 3 shows an illustrative example of a mortar-injection device in the form of a flexible plastic hose, i.e. a tubular container 40 provided at one side 42 with a welded aperture stub 44. The aperture stub 44 is sealed by a screw-cap, a cut-off lid or a pressed-in stopper. A clamp 48 of arbitrary design is located at the opposite open side 46 whereby the open side of the tube foil is held together and will be rolled-up in the manner of light-metal or tin-foil tube as the tube content is drained through the aperture stub 44, or, in the present case, when it is injected into a wall borehole. In lieu of the welded aperture stub 44, the side 42 of the tube Container 40 also can be completely closed by means of a welded seam, in which event, at the time of use, the sharp edge will be cut off and thereby an injection aperture will be obtained.

Ordinarily the dosage container 40 of FIG. 3 is filled with dry mortar material. For use, the clamp 18 is removed and a suitable curing medium, for instance water, is admixed in a suitable amount, whereupon the hose container 40 is closed again, its elasticity and lack of undue filling assuring that the required squeezing and "working" motions for thorough mixing can be carried out over the entire container periphery. To inject the mortar substance, the container is held by its aperture 44 against the borehole and then is appropriately emptied into it. In an embodiment mode not shown, a pouch with water or the like may be present in the hose container 40 besides the dry mortar material, where this pouch can be opened by external actuation, so that the clamp 48, once applied, need not be removed again.

The embodiment mode of FIG. 4 differs from that of FIG. 3 in that the hose container 40 is welded shut at both ends 42 and 46 and in that it contains besides the dry mortar material also a second container 50 for the second mortar component. The second container 50 may be enclosed in otherwise in free manner, or it might be attached by one edge to the foil of the hose container 40, and it is provided with a rated-rupture spot or a tear-open seam 52 that shall rip open when an external pressure is applied, without thereby however destroying the outer hose container 40.

The horizontal section of FIG. 5 shows a dosage container similar to that of FIG. 4 wherein the inside smaller pouch 50 is attached by one of its edges 54, for example by weld to the edge 48 of the outer hose container 40. In the manner shown in FIG. 3, an aperture stub 44 may be integrated or welded into the opposite end of the hose container 40 and when the aperture is to be used, will be cut open and be provided with a plug-on or screw-on nozzle member 56. The nozzle member 56 also may be used in the opened aperture of the hose container 40 of FIG. 4 by being inserted by its widened nozzle entrance end into the aperture and by being fastened to the aperture edge by a slipped-over outer clamp (omitted) or in other omitable manner.

In the variation shown n FIG. 6, the partition 60 is present in the hose container 40 which it divides into a larger segment 62 and a lesser segment 64, this partition containing an externally actuated tear-open aperture or seam to allow mixing the components of the two chambers.

We claim:

1. A mortar-anchored system for fastening construction components into lightweight masonry, wherein a wall borehole equipped with an anchoring means is filled through a lid means with mortar and wherein a fastening screw is threaded through the lid means into the anchoring means, characterized in that the lid means (10) comprises a bush segment (12) for entering the wall borehole (32), the bush segment has an opening extending through the lid means and acting as a coupling means for a nozzle (56) of a mortar injecting device (40) and this bush segment having an outside periphery being designed as retaining means for a first end of a wire spring (20) which is part of the anchoring means, and in that the wire spring (20) has a shape which tapers from widened zone (24) to a second end for unhindered spreading of mortar over the essential length of the wall bore hole (32) and acts as a guide for the thread of the fastening screw (28).

2. Mortar-anchor defined in claim 1, characterized in that the lid means (10) comprises an elastic edge (16) adaptable to the entry of the wall borehole (32) and having a reduced wall thickness.

3. Mortar-anchor defined in claim 1, characterized in that at least on approximately annular projection to keep in place the wire spring is present on the outer periphery of the leading end (18) of the bush segment (12).

4. Mortar-anchored system defined in claim 1, characterized in that projections are provided on the periphery of the bush segment (12) which match the shape of an outer thread and serve to keep fixed in place a rear end of the helically wound wire spring (20).

5. Mortar-anchored system defined in claim 1, characterized in that annular fins (14) are present behind the lid means (10) on the periphery of the bush segment 12 and are longitudinally spaced, which leave free a front segment (18) of the bush to hook-up to the spring.

6. Mortar-anchored system defined in claim 1 characterize in that the diameter of the spring starting at a tapered leading end (22) becomes enlarged to about the diameter of the wall borehole and is reduced at a rear hook-up end (26) down to about a rear bush diameter.

7. Mortar-anchored system defined in claim 1, characterized in that the spring (20) comprises a front segment (24) of the largest diameter from where the spring gradually tapers rearward toward its rear hook-up end (26).

8. Mortar-anchored system defined in claim 1, where the fastening screw is a wood screw sharply tapered at a front end (30).

9. Mortar-anchored system defined in claim 1, where the lid means(10) comprises a monitoring-aperture for the filled mortar material.

* * * * *